United States Patent [19]

Hargis

[11] Patent Number: 4,857,807

[45] Date of Patent: Aug. 15, 1989

[54] AUXILIARY LIGHT MODULE FOR VEHICLES

[76] Inventor: Charles W. Hargis, Rte. 17, Paradise Lake, Brazil, Ind. 47834

[21] Appl. No.: 92,368

[22] Filed: Sep. 2, 1987

[51] Int. Cl.$^4$ .............................................. H05B 37/00
[52] U.S. Cl. ........................................ 315/77; 315/86; 315/88; 307/10.8; 340/431
[58] Field of Search ...................... 315/135, 93, 77, 86, 315/88, 92; 307/10 LS, 38, 43; 362/20; 340/641, 642

[56] References Cited

U.S. PATENT DOCUMENTS

| | | | |
|---|---|---|---|
| 2,046,976 | 7/1936 | Sorensen | 315/86 |
| 3,666,959 | 5/1972 | Crews | 315/82 |
| 4,006,453 | 2/1977 | Bryant | 315/77 |
| 4,064,413 | 12/1977 | Andersen | 315/77 |
| 4,380,718 | 4/1983 | Miller | 315/77 |
| 4,631,649 | 12/1986 | McCue et al. | 362/20 |

Primary Examiner—Leo H. Boudreau
Assistant Examiner—Michael Razavi
Attorney, Agent, or Firm—Robert A. Spray

[57] ABSTRACT

An auxiliary light module for vehicles, giving "battery back-up" provisions, particularly useful for "semi" vehicles in which the pulling tractor electrically energizes the light systems of the pulled trailer by a connector strap or harness for interconnecting the tractor's output jack and the trailer's input jack; and the module provides a device conveniently connectable to both the tractor and trailer by jacking to the jacks now used by the jacks of such connector strap or harness. The module includes a battery, a switch, and circuitry for providing the electrical energization of the trailer's running lights and tail lights when the semi is stopped, and whether or not the tractor remains connected to the trailer, providing safety of the warning lights being lit, avoiding drain on the tractor's own battery, etc.

17 Claims, 1 Drawing Sheet

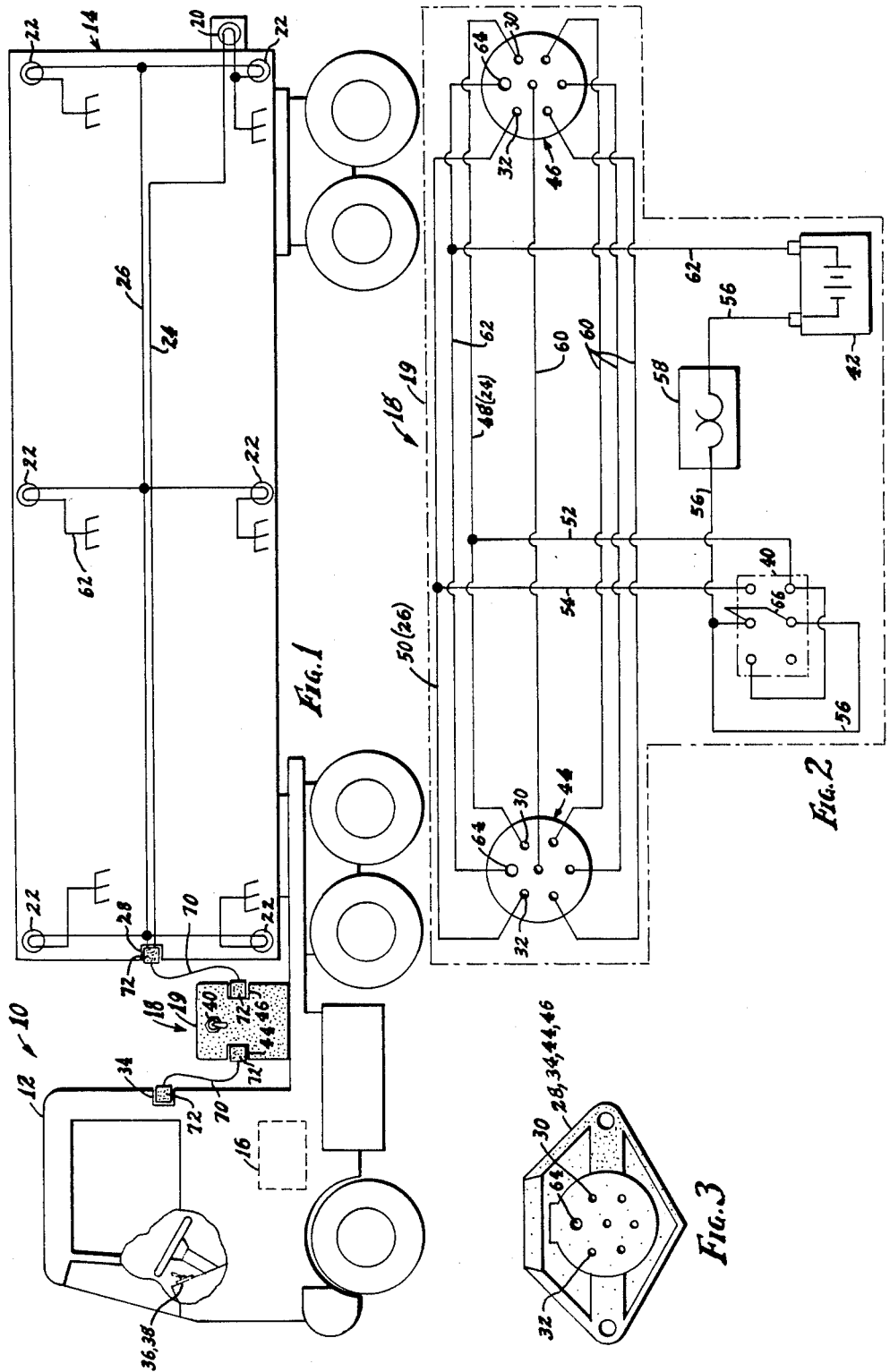

AUXILIARY LIGHT MODULE FOR VEHICLES

FIELD OF THE INVENTION

The present invention relates to vehicles, and more particularly to the problem of assuring that warning lights are kept lit when a vehicle is stopped, without undue battery drain.

Even more particularly, the present invention relates to the provision of an auxiliary light device for vehicles, giving "battery back-up" provisions, which is particularly useful for vehicles known as "semis" in which conventionally the pulling tractor is electrically connected to the light systems of the pulled trailer by a connector strap or harness which interconnects the tractor's output jack with the trailer's input jack.

The device advantageously used those jacks for its connection to the circuitry of both the tractor and the trailer, and replaces the conventional connector strap or harness; and when connected into the vehicle's electrical system, the device provides the full electrical energization of the trailer's running lights and tail lights. Even when the semi is stopped and even when the trailer is left parked along the highway with the tractor moved away, the invention provides for the trailer the safety of its warning lights being kept lit for prolonged periods; and this is without any drain at all on the primary battery of the semi's tractor.

Other features or advantages will be apparent as the description proceeds.

The Invention and the Inventive Concepts in summary form

In carrying out the invention in a preferred embodiment, the invention is provided as a modular device, including a battery, a switch, and circuitry for providing the electrical energization of each of the trailer's running lights and tail lights when the semi is stopped. The module's circuitry includes jacks for connecting the module electrically to the vehicle's jacks conventionally used for the energization of the trailer's own circuitries.

Specifics of the module's circuitry include "battery back-up" provisions, which are particularly useful for semi vehicles in which the vehicle's own battery is in the pulling tractor but energizes the trailer's circuitry; and the battery of the module provides energization of the trailer circuitry, even independently of the primary battery. Switching means as provided by the module permits the user to optionally use the module for energizing the trailer's running (or outline) lights, optionally, and also its tail lights.

This takes the load of all warning lights of a stopped trailer off the vehicle's battery, saving its charge for high-amperage duty of starting, etc., yet by being jacked also to the vehicle's battery circuit, the auxiliary battery of the modular is itself kept charged (or recharged) by the vehicle's primary battery. Other features are to be seen in the description.

The Prior Art has never achieved the Invention

Of course, batteries, switches, and electric circuitry have been known and used for scores of years; and surely every person in the modern world is quite familiar at least with flashlights if not even also other types of auxiliary light devices. Connectable jacks for electric circuits are of course also universally known, even on low-current extension lights which may be plugged into a vehicle's cigarette lighter which serves as a jack; and these and other factors of prior art knowledge and prior art devices are quite well known, to users, to competitive manufacturers, and to inventors the world over.

However, the existence of such articles and knowledge of the prior art is not only conceded, it is emphasized; for it is with similarities to long-known components and concepts that the present inventive concepts build, accomplishing a device of a construction and an operativity significantly different than just the components and operativities of all the articles of the prior art, and thus the inventive significance of the present concepts is emphasized, and the nature of the concepts and their results can perhaps be easier understood.

Even further as indicating the inventive nature of the present concepts is the result of a Preliminary Patentability Search made in the Search files of the U.S. Patent Office, after this invention was made, and during the course of considering the desire and likelihood of patent protection.

The Search produced the following, all U.S. Patents, even though the Search was conducted in nine different Sub-classes of three Classes:

U.S. Pat. No. 4,446,507, Daniels, 5/01/84,
U.S. Pat. No. 4,631,649, McCue et al., 12/23/86.

None of those references, however, show the concepts of either of the features of the present invention, as now shown.

The McCue et al. patent has a "battery-backup" concept, but its provisions fail to show or suggest a circuitry in series with a vehicle battery circuit and vehicle's light circuit, nor even to connect to a vehicle's light circuit at all as an auxiliary power for such a circuit exteriorly of the light fixture itself. Neither does is have or suggest the module of the present invention, nor its operativity.

As to the Daniels patent, although it shows a provision of a "spare" as to a vehicle lighting system, and shows a switch means for optionally engaging one or the other of a first lowbeam circuit and a spare one of such circuits, it does not even have a separate or backup battery, and neither does it have or suggest the module of the present invention nor its operativity.

The invention's components and concepts are similar to those available in the prior art, except for the present combination In the hindsight consideration of the present invention to determine its inventive and novel nature, it is not only conceded but emphasized that the prior art had details usable in this invention, but only if the prior art had had the guidance of the present concepts.

That is, it is emphasized that the prior art has long had several particulars:

a. The prior art had batteries, circuitry, switches, jacks, and even a module concept for such components;

b. The prior art has long known of the disadvantages of dead or low-charge batteries;

c. The prior art has long known of situations of a trailer to be parked along a highway, and the pulling tractor disconnected and moved away;

d. The prior art has provided devices and circuitry for many types of associated electrically-energized components;

e. Tractors and trailers of the prior art have long had output jacks and input jacks; and indeed it is with such conventional components of the prior art that the module of this invention is advantageously used;

f. All of these factors of prior art knowledge and components are well known not only to surely all manufacturers of vehicle accessories but even to surely most all users of vehicles for which these modules are advantageously to be used; and those users are familiar with the very vehicle jacks whose connector straps are replaced by the module of this invention.

Accordingly, the various concepts and components and knowledge factors of the prior art are conceded and emphasized to have been widely known in the prior art of vehicle accessories' manufacture and use; nevertheless, the prior art not having had such concepts, even only a fair amount of realistic humility, to avoid consideration of this invention improperly by hindsight, requires the concepts and achievement here to be realistically viewed as inventive in their nature.

BRIEF DESCRIPTION OF THE DRAWINGS

The above description of the novel and advantageous auxiliary light module, which provides more than a battery-backup by the novel combination of features, is of somewhat introductory and generalized form. More particular details, concepts, and features are set forth in the following and more detailed description of an illustrative embodiment, taken in conjunction with the accompanying drawings, which are of somewhat schematic and diagrammatic nature, for showing of the inventive concepts for such a advantageous module as the concepts of the present invention are illustrated in this embodiment.

In the drawings:

FIG. 1 is a diagrammatic elevational view of a vehicle known as a "semi," with mechanically-connected pulling tractor and pulled trailer, and with electric components schematically indicated as are relevant to a showing and understanding of the invention, together with a representation of a module of the invention;

FIG. 2 is a schematic view of the module of the invention, diagrammatically illustrating its components and circuitry; and FIG. 3 is a diagrammatic view of one of the connector jacks used in the use of the invention as per this embodiment.

DETAILED DESCRIPTION OF A PREFERRED EMBODIMENT OF THE INVENTION

As shown in the drawings, the present inventive concepts provide an advantageous auxiliary for vehicles, particularly useful for a vehicle known as a "semi" 10 having a pulling tractor 12 and a pulled trailer 14, and providing "backup" for the tractor battery 16; however, the concepts are not limited to those uses, as explained herein.

More particularly as shown, the concepts provide the operational effects by an auxiliary light module 18 shown provided in a container 19; and, in addition to other electrical circuitry or systems such as high-amperage starter and heater circuitry (not shown), such a vehicle 10 will have relatively low-amperage systems as for the trailer's tail lights 20 and running lights 22 (also called "marker" or "outline" lights).

Those low-current lights 20 and 22 are the lights which are serviced by the module 18; and the circuitry for energizing the trailer's tail lights 20 and running lights 22 is schematically shown and indicated herein as a first type (here tail lights) light system 24 and a second type (here running light) light system 26; and although both are of low current drain, their energization by the module 18 during lengthy stop-times of the vehicle 10 prevents drain of the battery 16, all as achieved as described herein.

The trailer 14, as shown, conventionally has an input jack means 28 having a first terminal 30 for the first type light system 24 and a terminal 32 for the second type light system 26; and the tractor vehicle 12 also conventionally has, correspondingly, an output jack means 34, having a first terminal 30 for a electrically energizing the vehicle's first type light system 24, and a second terminal 32 for electrically energizing the vehicle's second type light system 26.

Conventionally the tractor vehicle 12 also has a first switch means 36 for regulating the energization of the first type light system 24 from the vehicle's battery 16, and second switch means 38 for regulating the energization of the second type light system 36 from the vehicle's battery 16.

Those conventional vehicle 10 components of course are not asserted as parts of the present invention; but the present invention is associated with them advantageously, as herein described.

The module 18 as shown includes in its container 19 a switch means 40, a battery 42, and, for operative connection respectively to the tractor 12 and trailer 14, a first or input jack means 44 and a second or output jack means 46.

Also correspondingly, the module's first input jack means 44 has a first terminal 30 for connection to the vehicle's output jack means' first terminal 30, this for energizing the vehicle's first type light system 24; and the input jack means 44 has a second terminal 32 for connection to the vehicle's output jack means' second terminal 32, for energizing the vehicle's second type light system 26.

The correspondency is further shown by the module's second output jack means 46 having a first terminal 30 for connection to the vehicle's input jack means' first terminal 30, for energizing the vehicle's first type light system 24; and the output jack means 46 has a second terminal 32 for connection to the vehicle's input jack means second terminal 32, for energizing the vehicle's second type light system 26.

These energizations, which are received by the module's input jack means 44, are energizations by the vehicle's own battery 16; and the energizations given by the module's output jack means 46 are from either the vehicle's own battery 16, or the module's battery 42, as described further herein, and also dependent upon the setting of the vehicle's own light switches 36 and 38.

The module 18, internally of its container 19 in the form shown, is provided with circuitry 48 and 50. That is, the circuitry 48 and 50 comprises first circuitry 48 for interconnecting the said first terminals 30 of the vehicle's output jack means 34 and of the vehicle's input jack means 28, and second circuitry 50 for interconnecting the second terminals 32 of the vehicle's output jack means 34 and of the vehicle's input jack means 28; and thus terminals 30 connect circuits 48 (52) and 24, and terminals 32 connect circuits 50 (54) and 26.

Providing electrical energy to its internal circuitry 48 and 80, and thus electrically operative to the circuitry of the vehicle 10 as herein specified, the module 18 also is shown having in its container 19 energizing circuitry, connecting, in parallel, the module's first circuitry 48 and the module's second circuitry 50, respectively, to the module's switch means 40, this other energizing circuitry being shown as comprising, respectively, circuit branch 52 and circuit branch 54, leading from the switch 40 to those circuits 48 and 50, respectively.

Shown as energizing the switch 40, there is energizing circuitry 56 (shown through a circuit breaker 58) connecting the module's battery 42 to the module's switch means 40; and thus, as shown, the module's components and circuitry provide that if its second or output jack means 46 is connected to the vehicle's input jack means 28, the module's switch means 40 will permit (dependent upon the setting of the module switch 40) the module's battery 42 to energize one or both of the vehicle's first type (taillights 20) light system 24 and second type (running lights 22) light system 26, this being quite independent of any energization by the vehicle's battery 16, and thus without any drain thereof.

The components thus energized by the module 18's auxiliary battery 42 (by circuit 56 through circuit breaker 58 to the module switch 40) are, respectively, 52/48/24/20, and 54/50/26/22.

As mentioned, the vehicle 10 will conventionally have other circuitry and electrical systems, i.e., other than those of 24 (20) and 26 (22); and the auxiliary light module 18 provides for those other circuits also, that is, the vehicle's other type electrical system (other than its first type light system (20,24) and second type light system (22,26)).

More particularly, the module 18 is provided with means for accommodating or providing electrical interconnection of the other circuitry (not shown) between the tractor 12 and trailer 14 (each of which other circuitry would conventionally have its own corresponding other switch means (not shown); and accommodating the vehicle's input jack means 28 and output jack means 34 accordingly, as to their other terminals than their terminals (30 and 32) for electrically energizing the vehicle's first type light system 24 and second type light system 26, the module 18 is accordingly provided, as to its first (or input) jack means 44 and its second (or output) jack means 46, and additionally to the module's first circuitry 48 and second circuitry 50 which are connected to those module's jack means 44/46, with other circuitry 60 which is/are also connected to the modules jack means 44/46.

Such other circuitry 60 is electrically independent of the module's switch means 40, energizing circuitry 52/54, and battery 42, and provides for electrical energization of the other type electrical systems by the vehicle's battery 16, dependent of course upon the setting of the vehicle's other switch means (not shown).

As so far described, it should be noted that independent of the setting of the vehicle's first switch means 36 and second switch means 38, and of the setting of the vehicle's other switch means (not shown) for the circuitry other than the light circuits 20/24 and 22/26, and independent of the vehicle's battery 16, the module 18 (when jacked to vehicle jacks 28 and 34) provides by the module battery 42 for the electrical energization of the vehicle's first type light system 20/24 and second type light system 22/26, and accommodation of what any (or none) of the other circuitry is to be used by power from the vehicle battery 16.

The module 18 circuitry as shown also provides a "ground" circuit 62, connected to the ground terminal of the module battery 42, and connected to "ground" terminals 64 of the module jacks 44/46; and it will be understood that these terminals 64 would register with "ground" terminals of the vehicle's jack components.

With respect to registration of vehicle components, it will be also understood of course that the terminals of the module jacks 44/46 register appropriately with the vehicle jacks 28/34 and their terminals and circuitry. Polarization (proper orientation) is shown by "ground" terminals 64 being larger than the others. desirably also, to assure proper and corresponding registration with circuitry of the vehicle 10, the module 18's circuitry is colored conventionally as follows:

White: Ground 62/64
Brown: Taillights 20/24/30/48
Green: Right turn signal 60
Yellow: Left turn signal 60
Red: Brake lights 60
Black: Running lights 22/26/32/50
Blue: Auxiliary circuit 60

As to the module's switch means 40, it provides at least two settings in which a certain one of (here tail lights 20/24) the vehicle's first type light system 24 and second type light system 26 is always energized by the module's battery 42 whenever the module's output jack means 46 is connected to the vehicle's input jack means 28. In contrast, in only one of the switch-settings is the other one (here running lights 22/26) of the vehicle's first type light system 24 and second type light system 26 energized by the module's battery 42 whenever the module's output jack means 46 is connected to the vehicle's input jack means 28.

The switch 40 is shown of double-pole, double-throw type; and on one throw, its poles as contacted by the movable switch element 66 are respectively connected to circuits 52 and 54, whereas on the other throw only a pole connected to circuit 52 is contacted.

The module jacks 44 and 46 (both shown of female type, as are the vehicle jacks 34 and 28) do not in this embodiment directly engage the vehicle jacks 34 and 28, but respectively do so indirectly by electrical connector straps 70 shown having male jack-ends 72 on both ends; and it will be of course understood that the straps 70 each have all the connector circuitry 48/50/60/62 of the module, and have corresponding terminals 30/32, etc., thereof.

Tractor wiring (not shown) leads from terminals 30 and 32, respectively, of the tractor jack 34 to the tracotr's tail lighs and running (marker) lights; thus when the module 18 is jacked to the tractor jack 34 the module 18 will energize those sets of tractor lights, just as when the module 18 is jacked to the trailer jack 28 it energizes the trailer's sets of tail lights 20 and running lights 22, respectively.

By using combinations of input jack means to the tractor or trailer, or both, the operater can decide what circuitry of the vehicle is to be energized by the module 18.

Conclusion

It is thus seen that an auxiliary light module for vehicles, as constructed and used according to the inventive concepts herein set forth, provides novel concepts of a desirable and advantageous device, yielding the advantages of a safety-providing and reliable "battery-backup" means for a vehicle, and with handiness and operativity features even more than a spare battery would provide, and a convenience to such an extent that the user is encouraged to use it upon any occasion of a prolonged stop, thus saving the charge on the vehicle's battery for the vehicle battery's need of maximum charge for high-load uses such as engine starting, etc., yet the concepts also provide for convenient re-charging of the module's battery. Assembly and dis-assembly from the associated vehicle are both quite convenient, as is the change from one vehicle or to another, the assembly to or from a vehicle being substantially just as easy as use of the vehicle's electrical connector strap or harness.

In summary as to the nature of these advantageous concepts, their inventiveness is shown by novel features of both concept and construction shown herein, and by the novel concepts hereof not only being different from all the prior art known, but because the achievement is not what is or has been suggested to those of ordinary skill in the art,, especially realistically considering this as comprising standard-type components which are well known to most manufacturers of vehicles' electrical connector straps or harnesses which devices of the present invention advantageously replace, and including also surely most of the many thousands of vehicle drivers the world around, i.e., drivers of tractor-trailer combinations who every day connect or disconnect such connectors and who personally know of inconvenience, loss of time and money, safety hazard, etc., of battery mishaps, dead batteries, regulations and desires as to keeping warning lights lit, etc. Such knowledge of the need for this type equipment has been known for these vehicles for scores of years, the entire world over.

Yet, in spite of the detachability of the vehicles' connector straps, which hindsight might assert to have surely led to a suggestion of a convenient accommodation of some type of battery-backup provision, and in spite of what other hindsight might suggest, the realistic facts are that no prior art has suggested the modification of any prior art to achieve the novel concepts here achieved, and even though various types of battery back-up or other spare battery instances as a general concept have been known for many years as to many objects, and spare parts concepts even for vehicles, quite certainly no particular combination of references has been suggested by the prior art. Instead, this achievement has been a substantial departure from prior art, even though trucks or "semi" vehicles in particular have needed these concepts for scores of years, and uses of components of the module in non-analogous fields and fields outside the field of endeavor of such persons and companies indicated above have not suggested the particulars of a module as herein set forth.

And particularly is the overall difference from the prior art significant when the non-obviousness is viewed by a consideration of the subject matter as a whole, as integrally incorporating the features different from the prior art, in contrast to merely those details of novelty themselves.

Accordingly, it will thus be seen from the foregoing description of the invention according to this illustrative embodiment, considered with the accompanying drawings, that the present invention provides new and useful concepts of a novel and advantageous auxiliary light module for vehicles, having and yielding desired advantages and characteristics in construction and use, and accomplishing the intended objects, including those hereinbefore pointed out and others which are inherent in the invention.

Modifications and variations may be effected without departing from the scope of the novel concepts of the invention; accordingly, the invention is not limited to the specific embodiment, or form or arrangement of parts herein described or shown.

For example, additional low-amperage systems other than running lights and tail lights might be provided to be energized by a module of this invention; and the word "light" is herein used in the general sense of light duty or light amperage, rather than necessarily illumination, although particularly running or outline lights are especially considered as well as tail lights, both being of relatively low amperage-draw in comparison to starter circuits, many headlight circuits, etc. Also, although the module is shown with its input and output jacks respectively connected to jacks carried by strap segments which are both removably jacked to the the tractor's battery circuitry and the trailer's light circuitry, respectively some tractors or trailers may have their strip segments fastened integrally rather than releasably jacked; but the present concepts include whatever are the connections or jacks used, and male or female jack means may be provided, and adapters as to such connections, and strip segments accommodating the module to whatever is the nature of the associated vehicle. For any vehicle having an integral circuit connecting the battery circuit and light circuit, the integral circuit would be cut, and jacks installed for the battery circuit and light-circuit, providing for removable installation of a module of this invention.

I claim:

1. An auxiliary light module for vehicles having a first type light system and a second type light system, both of which light systems are connected to and engergized by the vehicle's battery independently of the vehicle being provided with an auxiliary light module as defined below, and an input jack means having a first terminal for the first type light system and a second terminal for the second type light system, the vehicle also having a battery and an output jack means having a first terminal for electrically energizing the vehicle's first type light system and a second terminal for electrically energizing the vehicle's second type light system, the vehicle also having a first switch means for regulating the energization of the first type light system from the vehicle's battery, and second switch means for regulating energization of the second type light system from the vehicle's battery, the vehicle's said first switch means and said second switch means being operative to regulate the energization of the vehicle's first type light system and second type light system independently of the auxiliary light module defined below;

the module comprising:

a switch means;

a battery;

a first input jack means and a second output jack means;

the module's first input jack means having a first terminal for connection to the vehicle's output jack means' first terminal for energizing the vehicle's first type light system, and a second terminal for connection to the vehicle's output jack means' second terminal for energizing the vehicle's second type light system;

the module's second output jack means having a first terminal for connection to the vehicle's input jack means' first terminal for energizing the vehicle's first type light system, and a second terminal for connection to the vehicle's input jack means' second terminal energizing the vehicle's second type light system;

the module also comprising first circuitry for interconnecting the said first terminals of the vehicle's said output jack means and of the vehicle's said input jack means, and second circuitry for interconnecting the said second terminals of the vehicle's said output jack means and of the vehicle's said input jack means;

the module also having energizing circuitry connecting, in parallel, the said module's first circuitry to the module's switch means and connecting the said module's second circuitry to the module's switch means;

and energizing circuitry connecting the module's battery to the module's switch means;

the module's components and circuitry providing that if its second jack means is connected to the vehicle's input jack means, the module's switch means will permit the module's battery to energize one or both of the vehicle's first type light system and second type light system independently of any energization by the vehicle's battery.

2. An auxiliary light module according to claim 1, in which the vehicle has other type electrical systems other than its said first type light system and second type light system, and correspondingly other switch means, and the vehicle's said input jack means and output jack means accordingly have other terminals than their said terminals for electrically energizing the vehicle's said first type light system and second type light system, the vehicle's said other terminals providing for electrical connection and energization of the circuitry of the vehicle's said other type electrical systems for their energization, depending on the setting of the vehicle's said other switch means;

and the module is accordingly provided, as to its first jack means and its second jack means, and in addition to its said first circuitry and second circuitry, with other circuitry;

said other circuitry being electrically independent of the module's switch means, energizing circuitry and battery;

said other circuitry of the module providing for electrical energization of the said other type electrical system by the vehicle's battery, dependent upon the setting of the vehicle's said other switch means, but, independently of the setting of the vehicle's first switch means and second switch means, and of the setting of the vehicle's said correspondingly other switch means, and also of the vehicle's battery, the module provides for the electrical energization of the vehicle's said first type light system and second type light system.

3. An auxiliary light module according to claim 1, in which the module's said switch means provides at least two settings in which a certain one of the vehicle's first type light system and second type light system is always energized by the module's battery whenever the module's said output jack means is connected to the vehicle's input jack means, and which in only one of those settings of the module's said switch means is the other one of the vehicle's first type light system and second type light system energized by the module's battery whenever the module's said output jack means is connected to the vehicle's input jack means.

4. An auxiliary light module according to claim 2, in which the module's said switch means provides at least two settings in which a certain one of the vehicle's first type light system and second type light system is always energized by the module's battery whenever the module's said output jack means is connected to the vehicle's input jack means, and which in only one of those settings of the module's said switch means is the other one of the vehicle's first type light system and second type light system energized by the module's battery whenever the module's said output jack means is connected to the vehicle's input jack means.

5. An auxiliary light module according to claim 1, in which the vehicle's said first type light system comprises tail lights of the vehicle.

6. An auxiliary light module according to claim 2, in which the vehicle's said first type light system comprises tail lights of the vehicle.

7. An auxiliary light module according to claim 3, in which the vehicle's said first type light system comprises tail lights of the vehicle, and it is the first type light system which is always so energized in the two settings.

8. An auxiliary light module according to claim 4, in which the vehicle's said first type light system comprises tail lights of the vehicle, and it is the first type light system which is always so energized in the two settings.

9. An auxiliary light module according to claim 1, in which the vehicle's said second type light system comprises running lights of the vehicle.

10. An auxiliary light module according to claim 2, in which the vehicle's said second type light system comprises running lights of the vehicle.

11. An auxiliary light module according to claim 3, in which the vehicle's said second type light system comprises running lights of the vehicle.

12. An auxiliary light module according to claim 4, in which the vehicle's said second type light system comprises running lights of the vehicle.

13. An auxiliary light module according to claim 5, in which the vehicle's said second type light system comprises running lights of the vehicle.

14. An auxiliary light module according to claim 6, in which the vehicle's said second type light system comprises running lights of the vehicle.

15. An auxiliary light module according to claim 7, in which the vehicle's said second type light system comprises running lights of the vehicle.

16. An auxiliary light module according to claim 8, in which the vehicle's said second type light system comprises running lights of the vehicle.

17. An auxiliary light module according to claim 1, in which the vehicle comprises separatable components, the vehicle's battery and output jack means being on one of the separatable components, and in which one or more lights of one of the types of light systems is/are on that one of the vehicle components, and one or more lights of one of the type of light systems is/are on the other of the vehicle components, yet the module provides energization operativity for all such lights when the vehicle components are not separated, but, also for the lights on either of the vehicle components when they are separated.

* * * * *

UNITED STATES PATENT AND TRADEMARK OFFICE
CERTIFICATE OF CORRECTION

PATENT NO. : 4,857,807
DATED : August 15, 1989
INVENTOR(S) : Charles W. Hargis

It is certified that error appears in the above-identified patent and that said Letters Patent is hereby corrected as shown below:

Col. 1, l. 17: Change "used" to: -- uses --.

Col. 3, l. 30: Change "a" to: -- an --.

Col. 4, l. 19: Change "36" to: -- 26 --.

Col. 4, l. 64: Change "80" to: -- 50 --.

Col. 5, l. 46: Change "modules" to: -- module's --.

Col. 6, l. 8: Change "desirably" to: -- Desirably --.

Col. 6, l. 47: Change "cotr's" to: -- ctor's --.

Col. 6, l. 47: Change "lighs" to: -- lights --.

Col. 8, l. 16: Change "tively" to: -- tively, --.

Col. 8, l. 31/32: Change "engergized" to: -- energized --.

Signed and Sealed this

Twenty-first Day of August, 1990

Attest:

HARRY F. MANBECK, JR.

*Attesting Officer*  *Commissioner of Patents and Trademarks*